United States Patent
Desai et al.

(10) Patent No.: US 10,931,756 B2
(45) Date of Patent: Feb. 23, 2021

(54) DIRECT FILE SEND FROM STORAGE TO END CLIENT BY TRANSFERRING SOCKET INFORMATION TO THE STORAGE

(71) Applicant: International Business Machines Corporation, Armonk, NY (US)

(72) Inventors: Anand Teerth Desai, Austin, TX (US); Douglas Griffith, Burnet, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/456,067

(22) Filed: Jun. 28, 2019

(65) Prior Publication Data
US 2020/0412804 A1    Dec. 31, 2020

(51) Int. Cl.
*G06F 15/16* (2006.01)
*H04L 29/08* (2006.01)
*H04L 29/12* (2006.01)

(52) U.S. Cl.
CPC .......... *H04L 67/1097* (2013.01); *H04L 67/06* (2013.01); *H04L 67/146* (2013.01); *H04L 61/2007* (2013.01); *H04L 69/326* (2013.01)

(58) Field of Classification Search
CPC ... H04L 67/1097; H04L 67/06; H04L 67/146; H04L 61/2007; H04L 69/326
USPC .......................... 709/217, 218, 219, 226, 227
See application file for complete search history.

(56) References Cited

U.S. PATENT DOCUMENTS

| | | | | |
|---|---|---|---|---|
| 7,913,115 | B1* | 3/2011 | Powers | G06F 11/0748 714/18 |
| 8,984,223 | B2* | 3/2015 | Peters | G06F 11/1076 711/114 |
| 9,229,750 | B1 | 1/2016 | Mehat et al. | |
| 9,756,084 | B2 | 9/2017 | Olivier et al. | |
| 9,819,593 | B1 | 11/2017 | Vetter et al. | |
| 2003/0140051 | A1* | 7/2003 | Fujiwara | H04L 67/1097 |
| 2005/0210145 | A1* | 9/2005 | Kim | H04N 21/4786 709/231 |
| 2019/0334825 | A1* | 10/2019 | Nadas | H04L 47/18 |

OTHER PUBLICATIONS

Eiraku, et al.; Fast networking with socket-outsourcing in hosted virtual machine environments; SAC '09; Proceedings of the 2009 ACM Symposium on Applied Computing; Jan. 2009; 310-317.

* cited by examiner

*Primary Examiner* — Liang Che A Wang
(74) *Attorney, Agent, or Firm* — James Nock; Andrew D. Wright; Roberts Calderon Safran & Cole, P.C.

(57) ABSTRACT

A method begins by sending, by a user computing device of a storage network, a read request regarding data to a host computing device of the storage network in accordance with a transport layer protocol, where the read request includes data retrieval information associated the data. The method continues with determining, by the host computing device, a storage entity of the storage network that is storing the data based on the data retrieval information. The method continues with sending, by the host computing device, socket information and data retrieval information to the storage entity. The method continues with sending, by the storage entity, the data directly to the user computing device in accordance with the socket information and using the session identifier.

20 Claims, 9 Drawing Sheets

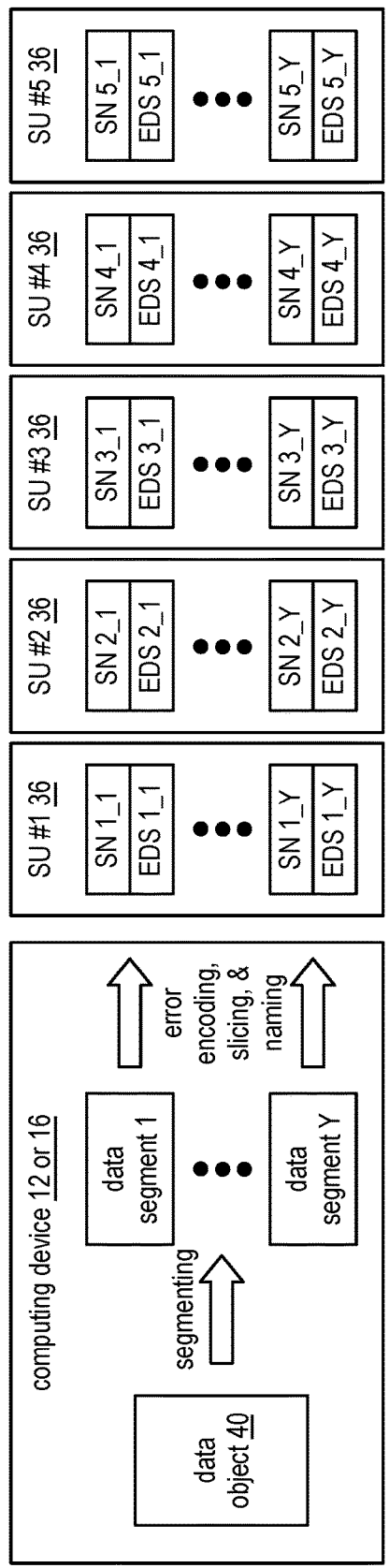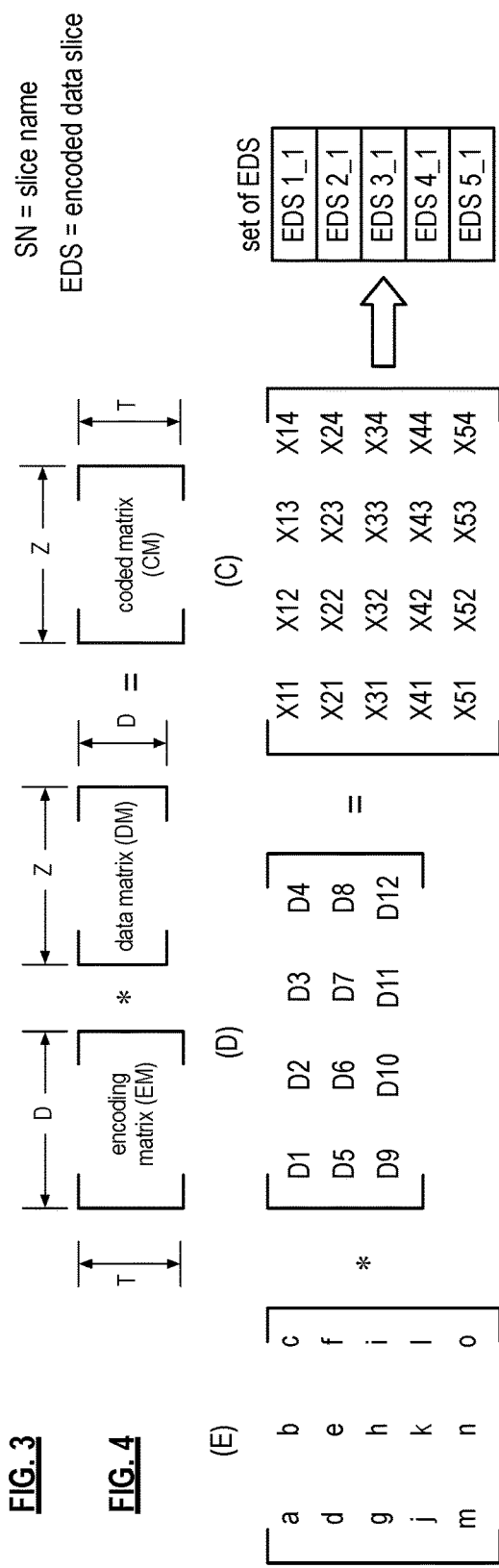

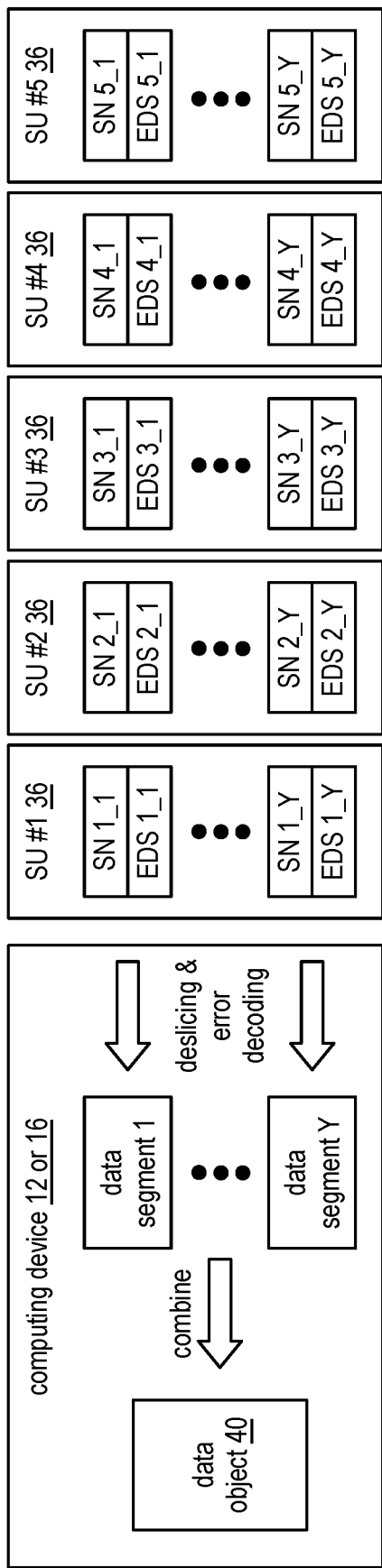

US 10,931,756 B2

DIRECT FILE SEND FROM STORAGE TO END CLIENT BY TRANSFERRING SOCKET INFORMATION TO THE STORAGE

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to storage of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

When a client device requests a file from a host device that is stored in back end storage, the host device allocates a memory buffer, retrieves the file from the back end storage, copies the file to the host kernel, then from the host kernel to a user state, then from the user state back to the kernel, and then from the kernel to a network drive. The host device then sends the file to the client device.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 7 is a schematic block diagram of an example of dispersed storage error decoding of data in accordance with the present invention;

FIG. 8 is a schematic block diagram of a generic example of an error decoding function in accordance with the present invention;

DETAILED DESCRIPTION OF THE INVENTION

Figure 1:
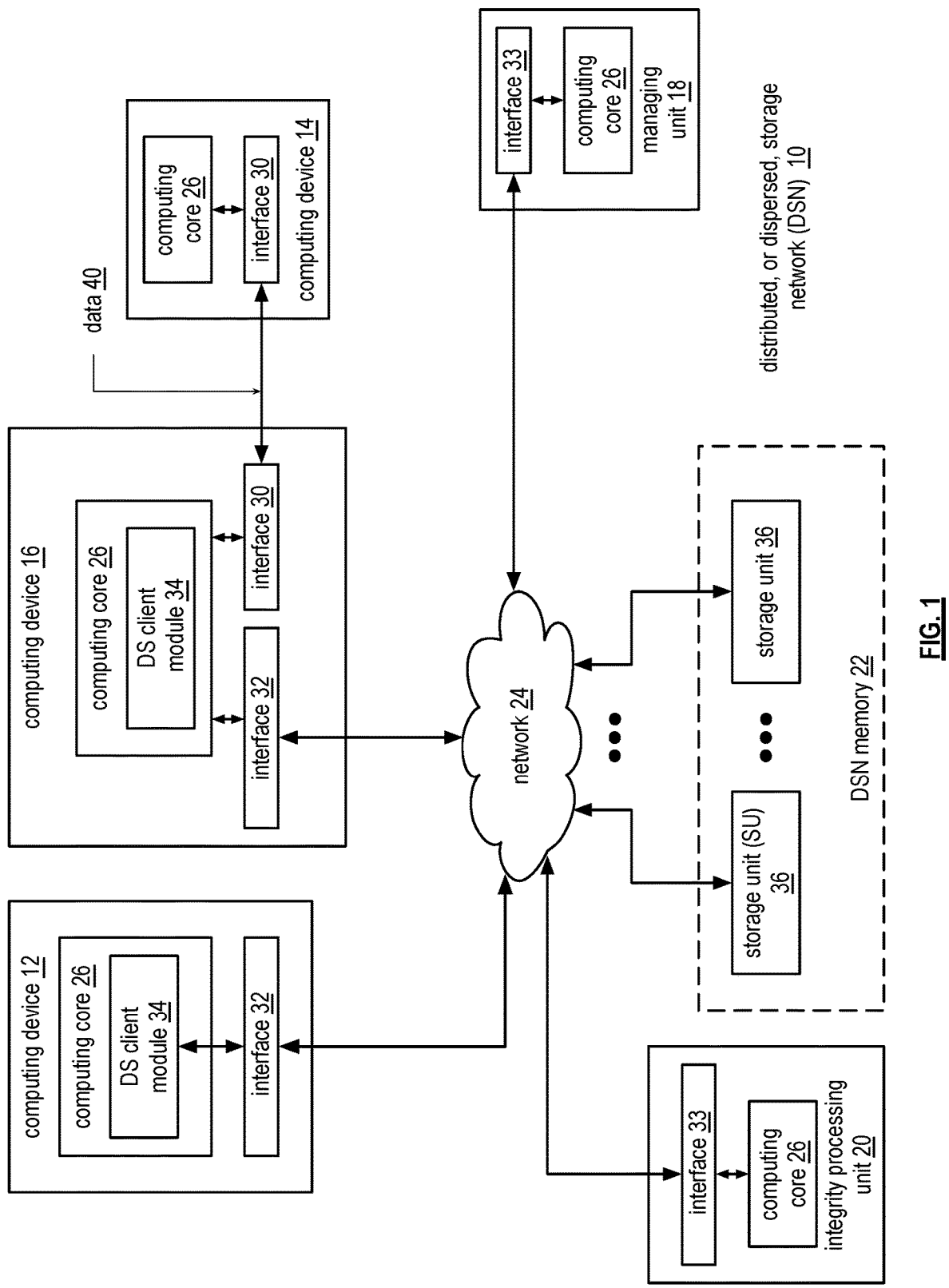
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
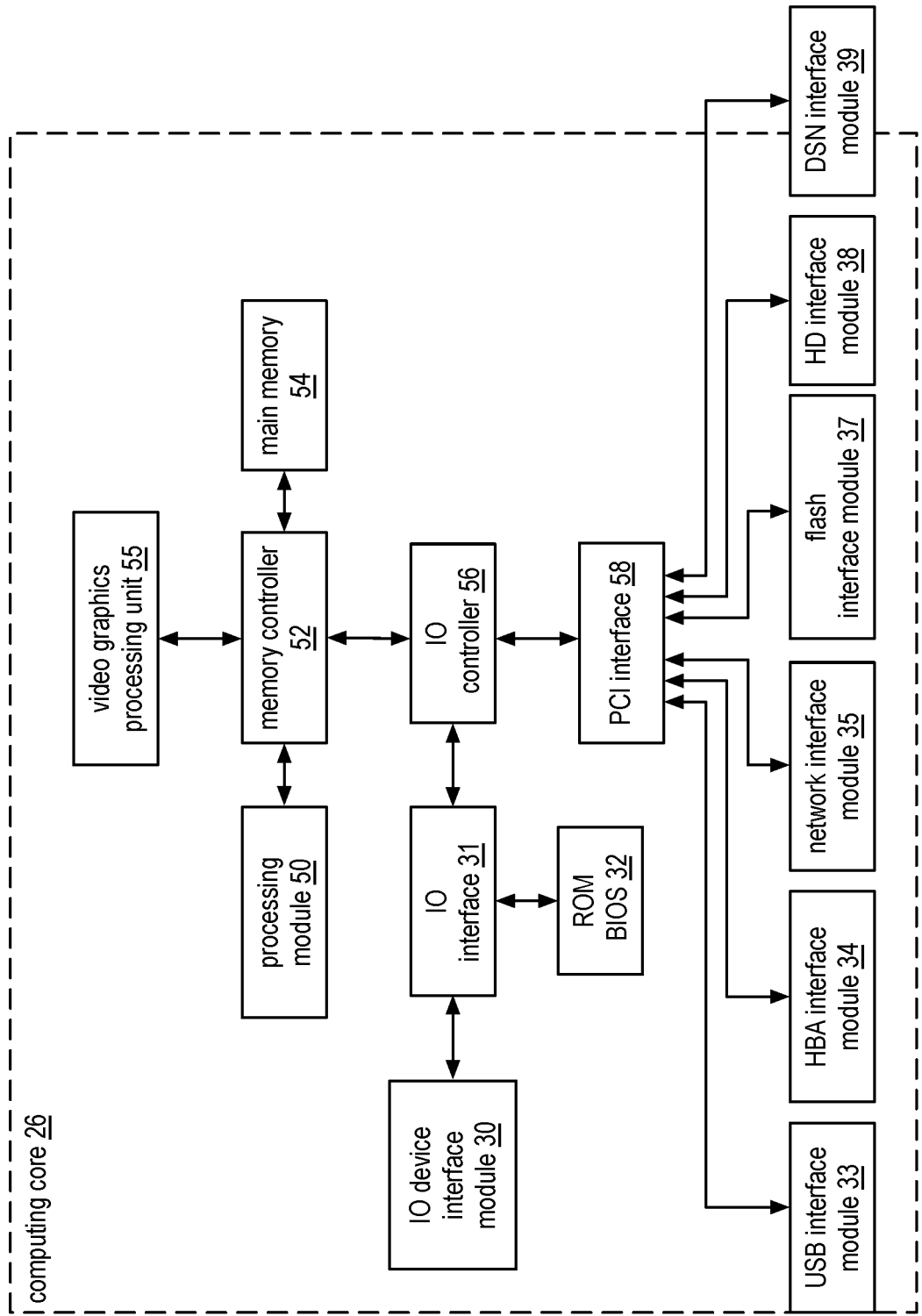
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data (e.g., data 40) on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 31, at least one IO device interface module 30, a read only memory (ROM) basic input output system (BIOS) 32, and one or more memory interface modules. The one or more memory interface module(s) includes one or more of a universal serial bus (USB) interface module 33, a host bus adapter (HBA) interface module 34, a network interface module 35, a flash interface module 37, a hard drive interface module 38 and a DSN interface module 39.

The DSN interface module 39 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 59 is shown in FIG. 6. As shown, the slice name (SN) 59 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
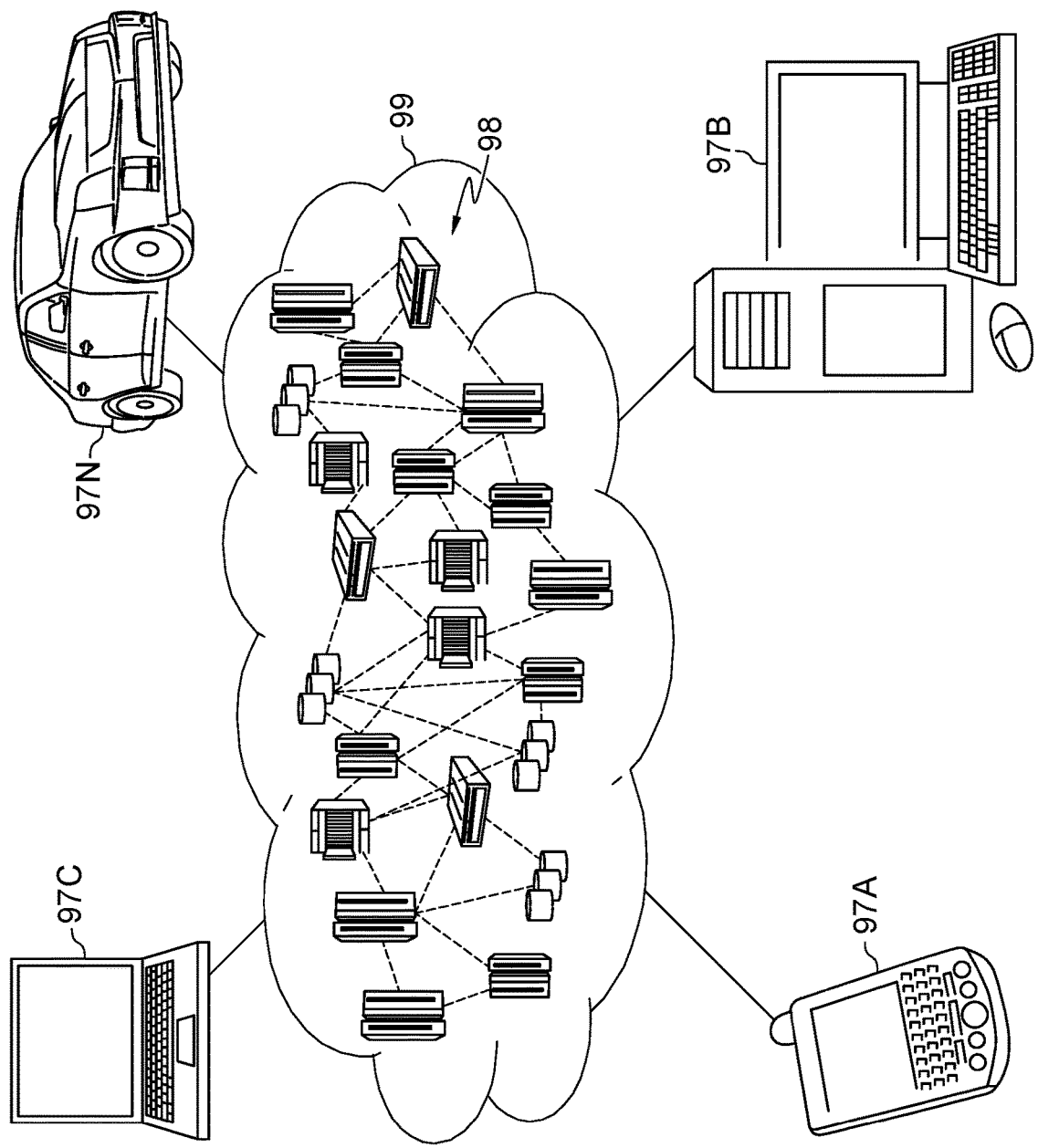
FIG. 9 is a schematic block diagram of an embodiment of a cloud computing in accordance with the present invention.

Referring now to FIG. 9, an illustrative cloud computing environment 99 is depicted. As shown, cloud computing environment 99 includes one or more cloud computing nodes 98 with which local computing devices used by cloud consumers, such as, for example, personal digital assistant (PDA) or cellular telephone 97A, desktop computer 97B, laptop computer 97C, and/or automobile computer system 97N may communicate. Nodes 98 may communicate with one another. They may be grouped (not shown) physically or virtually, in one or more networks, such as Private, Community, Public, or Hybrid clouds as described hereinabove, or a combination thereof. This allows cloud computing environment 99 to offer infrastructure, platforms and/or software as services for which a cloud consumer does not need to maintain resources on a local computing device. It is understood that the types of computing devices 97A-N shown in FIG. 1 are intended to be illustrative only and that computing nodes 98 and cloud computing environment 99 can communicate with any type of computerized device over any type of network and/or network addressable connection (e.g., using a web browser).

Figure 10:
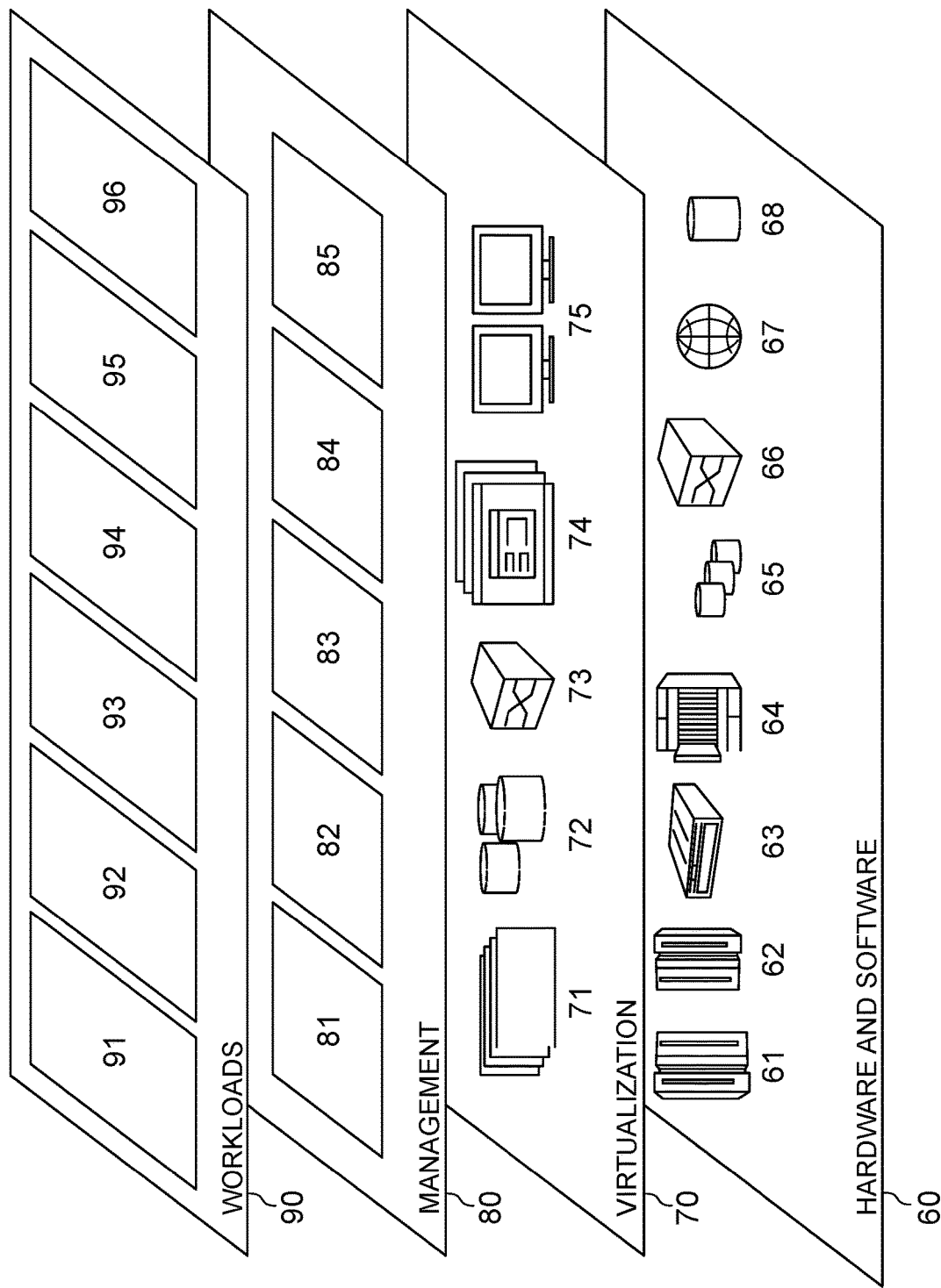
FIG. 10 is a schematic block diagram of an embodiment of abstraction model layers in accordance with the present invention.

Referring now to FIG. 10, a set of functional abstraction layers provided by cloud computing environment 99 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and mobile desktop 96.

Figure 11:
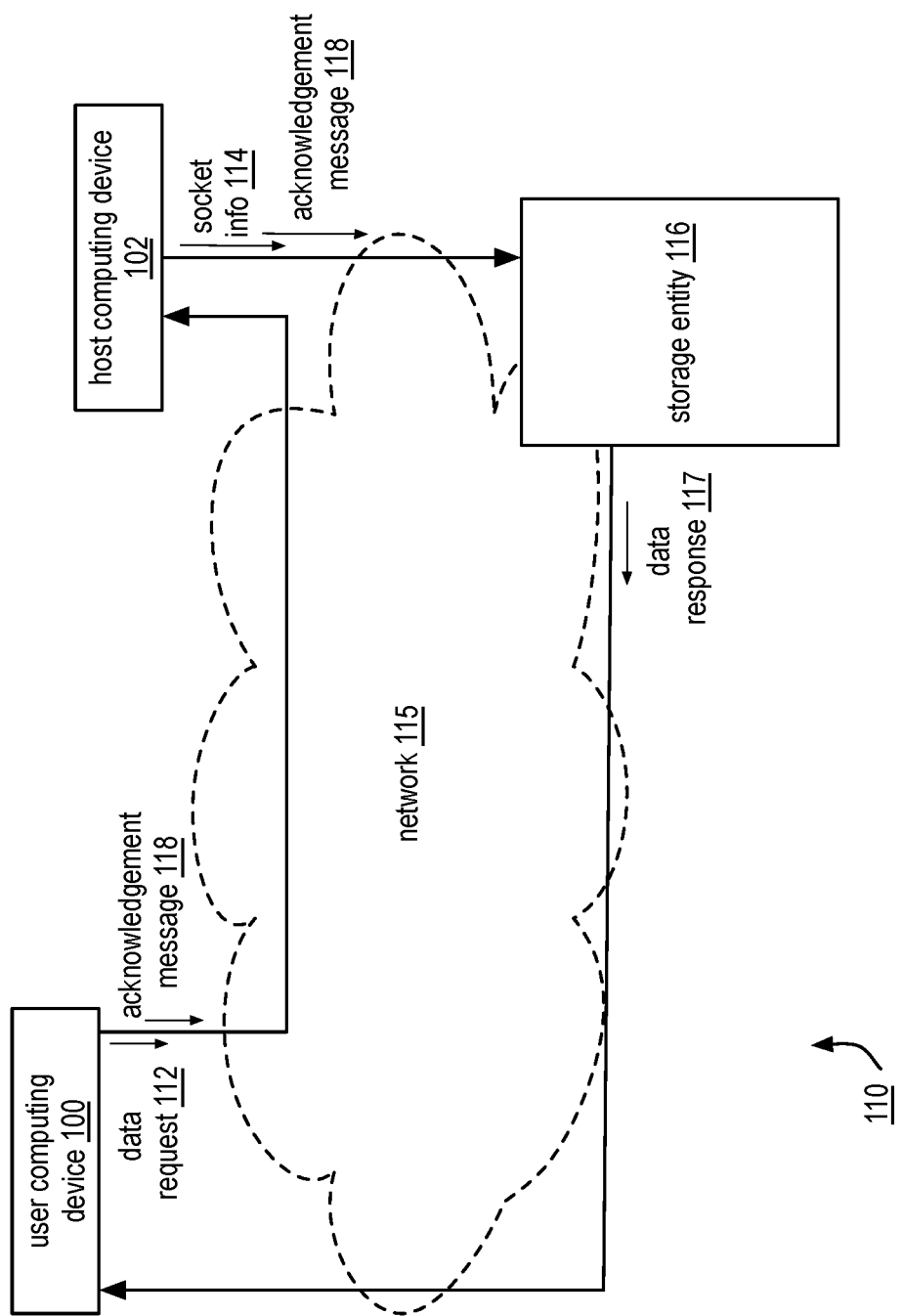
FIG. 11 is a schematic block diagram of an embodiment of a storage system in accordance with the present invention.

FIG. 11 is a schematic block diagram of an example of a storage system or network 110 (e.g., a cloud computing environment, a dispersed storage network (DSN)). The storage system 110 includes a user computing device 100, a host computing device 102, a network 115, and a storage entity 116. The user and host computing devices 100 and 102 may be implemented by a computing device 12-16 of FIG. 1, and/or a computing device 97A-N of FIG. 9. The network 115 may be implemented by the network 24 of FIG. 1 and/or the cloud computing environment 99 of FIG. 9. The storage entity 116 may be implemented by one or more of storage units 36 of FIG. 1, DSN memory 22 of FIG. 1 and nodes 98 of FIG. 9. Note in one embodiment, the user computing device is another host computing device.

In an example of operation, the user computing device 100 sends a data request 112 regarding data to the host computing device 102 in accordance with a transport layer protocol via the network 115. The data request 112 may also include data retrieval information. For instance, the data retrieval information is an identifier of the data. As another instance, the data retrieval information is extent information (e.g., starting logical address, count (e.g., length from starting address)) regarding the data.

The transport layer protocol includes one or more protocols for the user computing device to communicate with the host computing device. In one example, the transport layer protocol includes one of a transmission control protocol (TCP) and a user datagram protocol (UDP). As another example, the transport layer protocol includes one of a reliable data protocol (RCP), a stream control transmission protocol (SCTP), a sequenced packet exchange (SPX), and a multipath TCP (MPTCP).

In another example, the transport layer protocol includes use of any layers of the open systems interconnection (OSI) model for the user computing device to effectively communicate with the host computing device. In one example, the user computing device does not have access to the storage entity and the host computing device is a conduit for the user computing device to access the storage entity.

In one embodiment, a transmission control protocol (TCP) socket connection is setup between the user computing device 100 and the host computing device 102. For example, when utilizing TCP/IP (internet protocol) for communication, the user computing device and host computing device complete a three-way handshake to setup the TCP socket connection. In another embodiment, (e.g., when using a user datagram protocol) the user computing device establishes communication with the host computing device utilizing a datagram socket.

Having received the data request 112, the host computing device 102 determines that the data is stored in a storage entity of the storage network 110. For example, the host computing device receives an identifier of the data, utilizes a look up table to determine the storage entity is storing the data. In one example, a storage entity is a network based data server hosting file systems that can be configured for individual hosts. In another example, the storage entity is a set of storage units of a dispersed storage network (DSN). In yet another example, the storage entity is a cloud based storage memory.

The host computing device sends the data access request and socket information to the storage entity. In one example, the socket information allows the storage entity to "pretend" (e.g., by utilizing a kernel extension, a user state program, low level code, etc.) to be the host computing device and send information to the user computing device directly (e.g., via a session between the user computing device and the host computing device). The socket information includes an internet protocol (IP) address of the user computing device, an IP address of the host computing device, a port identifier of the user computing device, and a port identifier of the host computing device. The socket information may further include a sequence number, an integrity value and other information necessary for proper communication between the storage entity and the user computing device.

The storage entity 116 sends a data response 117 to the user computing device 100 utilizing the socket information 114. For example the storage entity 117 sends a TCP packet to the user computing device 100 that includes a header with a port identifier (ID) (e.g., a number between 0-65535) of the host computing device 102, a port ID (e.g., a number between 0-65535) of the user computing device 100 and a sequence number that indicates the TCP packet is from the host computing device (e.g., sequence number matches an expected sequence number).

In one example, when utilizing a transport layer protocol that utilizes acknowledgements (e.g., TCP), the user computing device 100 sends an acknowledgement receipt or message 118 to the host computing device 102 indicating the communication of data in the data response 117 between the storage entity 116 and the user computing device 100 was successful. For example, when the data request 112 is a read request, the user computing device receives data (e.g., data response 117) from the storage entity and sends the acknowledgement receipt 118 to the host computing device 102. The host computing device 102 then sends the acknowledgement receipt 118 to the storage entity 116. When an acknowledgement receipt is not received by the host and/or the storage entity in a time period, the storage entity resends the missing data packet. When the transport layer protocol does not utilize acknowledgements, the storage entity does not wait for an acknowledgement to resend or send another data packet in the sequence. Instead, the storage entity 116 continues to send the data to the user computing device 100 in accordance with the respective socket information 114.

Note in one example, the user and/or the host computing device may be implemented on or in conjunction with a virtual machine. Further note, that by enabling the storage entity to directly send data to the user computing device, a latency of the fulfillment of the data request is reduced. Further, memory bandwidth of the host is reduced. Still further, memory and central processing unit (CPU) resources have greater availability for other processes.

Figure 12:
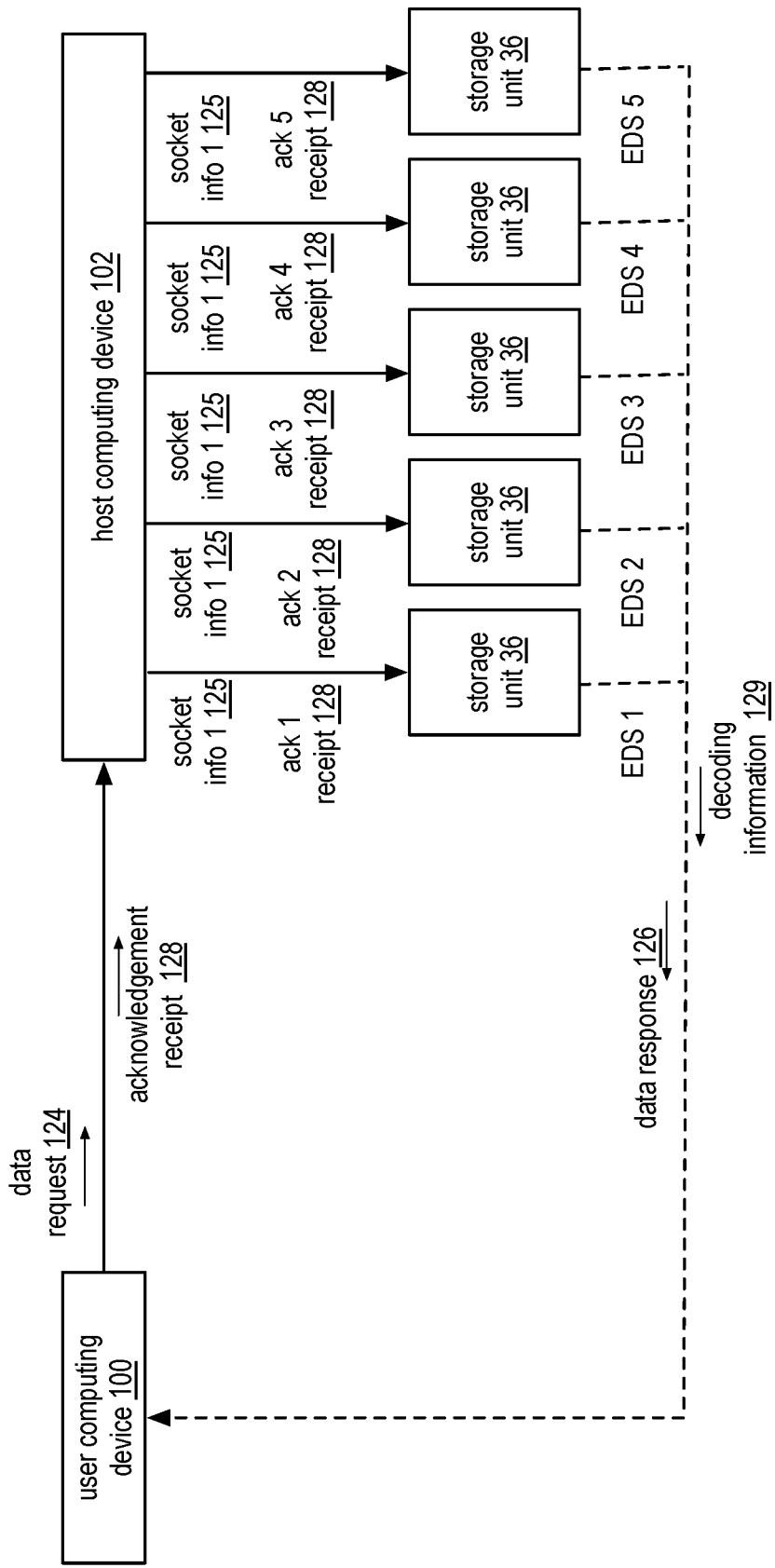
FIG. 12 is a schematic block diagram of another embodiment of a storage system in accordance with the present invention.

FIG. 12 is a schematic block diagram of an embodiment of a dispersed storage network (DSN) that includes a user computing device 100, a host computing device 102, and a set of storage units 36. The user and host computing devices 100-102 may be implemented by a computing device 12-16 of FIG. 1 and/or a computing device 97A-N of FIG. 9. The storage entity 116 may be implemented by one or more of storage units 36 of FIG. 1, DSN memory 22 of FIG. 1 and nodes 98 of FIG. 9. Note in one embodiment, the user computing device is another host computing device. Further note, that although not explicitly shown, the network 115 of FIG. 11 may be utilized for communication between the user computing device 100, the host computing device 102 and the set of storage units 36.

In an example of operation, the user computing device 100 sends a data request 124 (e.g., a read request, a write request) to the host computing device 102 in accordance with a transport layer protocol. In one example, the data request includes socket information of a session in accordance with a protocol (e.g., TCP/IP). Note when necessary (e.g., for a TCP session), a connection may be made between the user and host computing devices prior to sending the data request 124.

The host computing device 102 determines whether data identified in the data request 124 is stored in a storage units of the DSN. When the data is stored in the storage units 36, the host computing device 102 sends the storage units 36 socket information 1-5 125 regarding the existing session and the data request 124. The storage units 36 utilize the socket information 125 to send respective encoded data slices (EDS 1-5), as data response 126, to the user computing device 100. In one example, the storage units also send decoding information 129 to the user computing device 100 to enable recovery (e.g., dispersed storage error decoding) of the data from the encoded data slices 1-5. The decoding information 129 includes one or more of an encoding function, a pillar width number, a decode threshold number, slicing information, slice security information and a segmenting scheme. In one example, only one of the storage units or the host computing device sends the decoding information 129 to the user computing device.

When utilizing a protocol that utilizes acknowledgments for the data communication, the user computing device 100 sends an acknowledgment receipt 128 to the host computing device. In one example, the acknowledgment may be on a slice by slice basis. For example, the user computing device 100 sends an acknowledgment for each encoded data slices it received from the set of storage units 36. As a specific example, when the decode threshold is 4, and the user computing device receives encoded data slices EDS1, EDS2, EDS4 and EDS5, the user computing device decodes the encoded data slices to recover a corresponding data segment and sends an acknowledgement to the host computing device indicating encoded data slices EDS1, EDS2, EDS4 and EDS5 where the encoded data slices it received and/or utilized for the decoding. Alternatively, when the data segment is able to be recovered, the user computing device 100 sends an acknowledgment receipt 128 to the host computing device 102 indicating that the data segment was received.

As another specific example, when the decode threshold is 4, and the user computing device receives encoded data slices EDS1, EDS2, and EDS5, the user computing device does not have enough encoded data slices to recover the corresponding data segment. In one embodiment, the user computing device 100 sends an acknowledgement to the host computing device indicating encoded data slices EDS1, EDS2, and EDS5 received. The host then can direct storage units 3 and/or 4 to send at least one of encoded data slices EDS3 and EDS4 to the user computing device 100. In another embodiment, when the user computing device does receive a decode threshold number of encoded data slices, the user computing device sends another request for at least one of the encoded data slices it didn't receive (e.g., decode threshold number−number of received encoded data slices).

Figure 13:
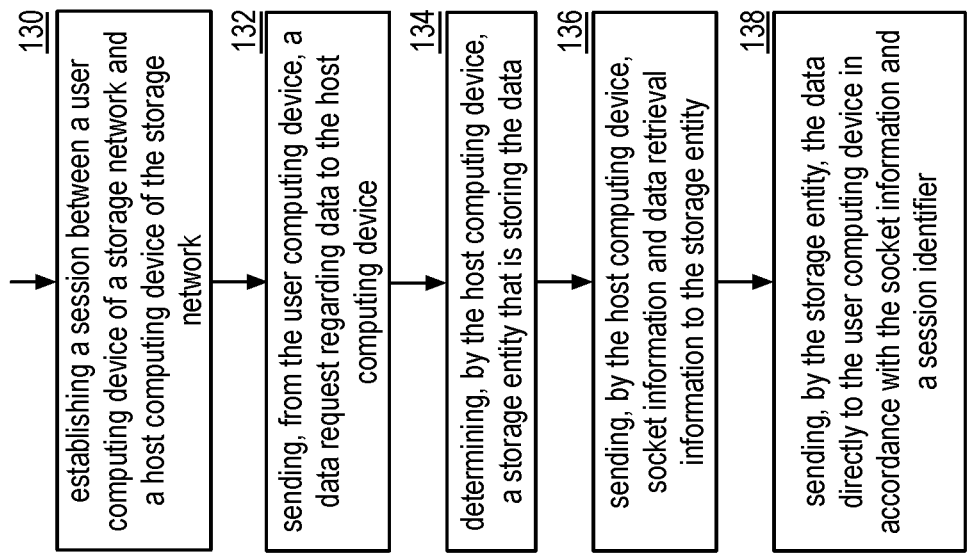
FIG. 13 is a flowchart illustrating an example of directly sending data from a storage entity to a user computing device in accordance with the present invention.

FIG. 13 is a flowchart of an example of a method of an example of directly sending data from a storage entity to a user computing device in a storage network. The method begins or continues at step 130, where a user computing device (e.g., of a cloud computing environment, of a dispersed storage network (DSN)) establishes a session between a user computing device of the storage network and a host computing device of the storage network. For example, when the session is in accordance with a transmission control protocol (TCP), the computing device (e.g., the user computing device, the host computing device) establishes a connection in accordance with a handshake process (e.g., a three-way handshake). The user computing device sends a synchronize "SYN" message to the host computing device, in which the user computing device sets a sequence number to a random value "A". The host computing device replies with a synchronize acknowledgment "SYN-ACK" message in which an acknowledgment number (e.g., set in a bit of a TCP header of the SYN-ACK message) is set to a value that is one more than the received sequence number (e.g., A+1) and a sequence number is set to another random value "B". The user computing device then sends an acknowledgment "ACK" message to the host computing device that includes the sequence number "A+1" and an acknowledgement number set to one more than the random value "B" (e.g., B+1) to complete the handshake.

The method continues to step 132, where the user computing device sends a data request regarding data to the host computing device. In one example, the data request includes an identifier of the data. For example, the data request may include slice names of encoded data slices. In another example, the data request includes a list of extents (e.g., a starting logical block address and a count).

The method continues to step 134, where the host computing device determines a storage entity is storing or is to store the data associated with the data request. For example, the host computing device determines a set of storage units of a DSN is storing encoded data slices associated with a read request. Note a plurality of data segments of the data is dispersed storage error encoded into a plurality of sets of encoded data slices, where the plurality of sets of encoded data slices includes the encoded data slices.

Having determined a storage entity associated with the data request, the method continues with step 136, where the host computing device sends socket information to the storage entity. The socket information includes at least some of a sequence number, an integrity value, an acknowledgement number, a host computing device port identifier, a user computing device port identifier, an IP address of the user computing device, and an IP address of the host computing device.

The method continues to step 138, where the storage entity fulfills the data request with the user computing device in accordance with the socket information. For example, when the data request is a read request, the storage entity sends data to the user computing device utilizing the session. For example, the storage entity sends data packets to the user computing device utilizing the socket information.

Note a computer readable storage device that includes one or more elements that store operational instructions that when executed by a computing device, is operable to perform any of the above methods. Further note that a computing device that includes memory, an interface, and a processing module operably coupled to the memory and the interface, is able to perform any of the above methods.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory or a computer readable storage device includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

What is claimed is:

1. A method comprises:
establishing, by a host computing device of a storage network, a transmission control protocol (TCP) session by establishing a TCP socket connection between a user computing device of the storage network and the host computing device;
receiving, by the host computing device, a read request regarding data from the user computing device of the storage network, wherein the user computing device communicates with the host computing device via a session identifier, and wherein the read request includes data retrieval information associated with the data;
determining, by the host computing device, a storage entity of the storage network that is storing the data based on the data retrieval information;
sending, by the host computing device, socket information regarding the existing TCP socket connection and data retrieval information to a kernel extension on the storage entity, the socket information including an internet protocol (IP) address of the user computing device, an IP address of the host computing device, a port identifier of the user computing device, and a port identifier of the host computing device, whereby the storage entity sends the data directly to the user computing device in accordance with the socket information using the session identifier to indicate to the user computing device that the data is from the host computing device;
receiving, by the host computing device, an acknowledgement from the user computing device indicating the data was sent from the storage entity to the user computing device; and
sending, by the host computing device, the acknowledgement to the storage entity.

2. The method of claim 1, wherein the acknowledgement indicates a portion of the data has been successfully communicated between the storage entity and the user computing device.

3. The method of claim 1, wherein the storage entity comprises one or more of:
an external hard disk drive;
a cloud based storage memory; and
one or more sets of storage units.

4. The method of claim 1, wherein the socket information further comprises
a sequence number; and an integrity value.

5. The method of claim 1, wherein the data retrieval information comprises one or more of:
an identifier of the data; and
extent information regarding the data.

6. The method of claim 1, wherein the determining the storage entity of the storage network that is storing the data based on the data retrieval information comprises utilizing a look up table and an identifier of the data in the data retrieval information to determine the storage entity of the storage network that is storing the data.

7. The method of claim 1, wherein the data sent directly from the storage entity to the user computing device is in the form of a TCP packet including a header with the port ID of the host computing device, the port ID of the user computing device, and a sequence number that indicates the TCP packet is from the host computing device.

8. The method of claim 1, wherein the data comprises encoded data slices, and wherein the acknowledgement received by the host computing device indicates the encoded data slices were utilized for decoding by the user computer device.

9. The method of claim 1, wherein the establishing the TCP session comprises completing a three-way handshake.

10. The method of claim 1, wherein the data comprises encoded data slices, and wherein the storage entity sends decoding information to the user computing device and the host computing device does not send decoding information to the user computing device.

11. A computer readable storage device comprises:
a first memory element for storing operational instructions that when executed by a host computing device of a storage network, causes the host computing device to:

establish a transmission control protocol (TCP) session by establishing a TCP socket connection between a user computing device of the storage network and the host computing device;

receive a read request regarding data from the user computing device of the storage network, wherein the user computing device communicates with the host computing device via a session identifier, and wherein the read request includes data retrieval information associated with the data;

determine a storage entity of the storage network that is storing the data based on the data retrieval information;

send socket information regarding the existing TCP socket connection and data retrieval information to a kernel extension on the storage entity, the socket information including an internet protocol (IP) address of the user computing device, an IP address of the host computing device, a port identifier of the user computing device, and a port identifier of the host computing device, whereby the storage entity sends the data directly to the user computing device in accordance with the socket information using the session identifier to indicate to the user computing device that the data is from the host computing device;

receive an acknowledgement from the user computing device indicating the data was sent from the storage entity to the user computing device; and send the acknowledgement to the storage entity.

12. The computer readable storage device of claim 11, wherein the acknowledgement indicates the portion of the data has been successfully communicated between the storage entity and the user computing device.

13. The computer readable storage device of claim 11, wherein the storage entity comprises one or more of:
an external hard disk drive;
a cloud based storage memory; and
one or more sets of storage units.

14. The computer readable storage device of claim 11, wherein the socket information further comprises:
a sequence number; and an integrity value.

15. The computer readable storage device of claim 11, wherein the data retrieval information comprises one or more of:
an identifier of the data; and
extent information regarding the data.

16. The computer readable storage device of claim 11, wherein the determining the storage entity of the storage network that is storing the data based on the data retrieval information comprises utilizing a look up table and an identifier of the data in the data retrieval information to determine the storage entity of the storage network that is storing the data.

17. The computer readable storage device of claim 11, wherein the data sent directly from the storage entity to the user computing device is in the form of a TCP packet including a header with the port ID of the host computing device, the port ID of the user computing device, and a sequence number that indicates the TCP packet is from the host computing device.

18. The computer readable storage device of claim 11, wherein the data comprises encoded data slices, and wherein the acknowledgement received by the host computing device indicates the encoded data slices were utilized for decoding by the user computer device.

19. The computer readable storage device of claim 11, wherein the establishing the TCP session comprises completing a three-way handshake.

20. The computer readable storage device of claim 11, wherein the data comprises encoded data slices, and wherein the storage entity sends decoding information to the user computing device and the host computing device does not send decoding information to the user computing device.

* * * * *